Feb. 18, 1947. C. E. KERR 2,416,008
STRING BEAN GRADER
Filed July 6, 1942 2 Sheets-Sheet 1

INVENTOR:
CHARLES E. KERR
BY
ATTORNEY

Feb. 18, 1947.  C. E. KERR  2,416,008
STRING BEAN GRADER
Filed July 6, 1942  2 Sheets-Sheet 2
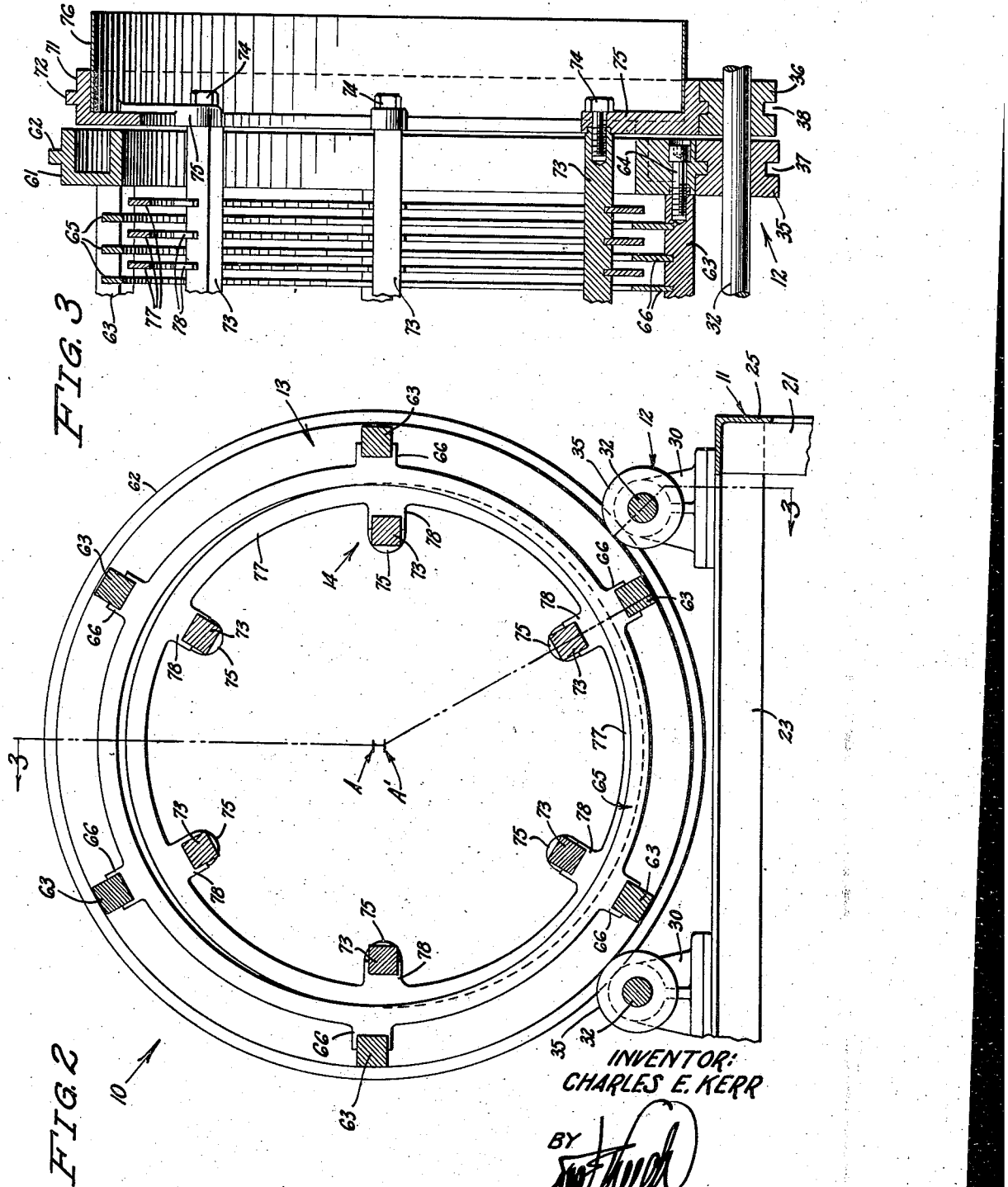
INVENTOR:
CHARLES E. KERR
BY
ATTORNEY Patented Feb. 18, 1947

2,416,008

UNITED STATES PATENT OFFICE 2,416,008

STRING BEAN GRADER

Charles E. Kerr, Hoopeston, Ill., assignor to Food Machinery Corporation, San Jose, Calif., a corporation of Delaware Application July 6, 1942, Serial No. 449,865

5 Claims. (Cl. 209—98)

This invention relates to rotary graders and is particularly useful in the sizing of string beans.

Graders of this same general type have been provided previously for this purpose but these have been complicated in design combining a large number of individual parts having articulation relative to each other thus causing a large amount of wear and considerably limiting the life of the grader.

It is an object of the present invention to provide a bean grader which is much simpler in design than its predecessors; which because of its simplicity is relatively light in weight; and which is comprised of comparatively few operating parts thus greatly reducing the wear of the equipment and lengthening its life.

Another object of the invention is to provide such a grader in which the sizing function will be accurately performed throughout the life of the machine without the necessity of frequent repair and adjustment.

It is a further object of the invention to provide a grader achieving the foregoing objects at a lower cost than necessary in building graders of the rotary type in the prior art and at the same time increase the capacity of the machine of a given size and eliminate damage to the beans.

The manner of accomplishing the foregoing objects as well as further objects and advantages will be made manifest in the following description taken in connection with the accompanying drawings in which;

Fig. 2 is an enlarged cross sectional view taken on the line 2—2 of Fig. 1.

Fig. 3 is a fragmentary cross sectional view taken on the line 3—3 of Fig. 2.

Figure 1:
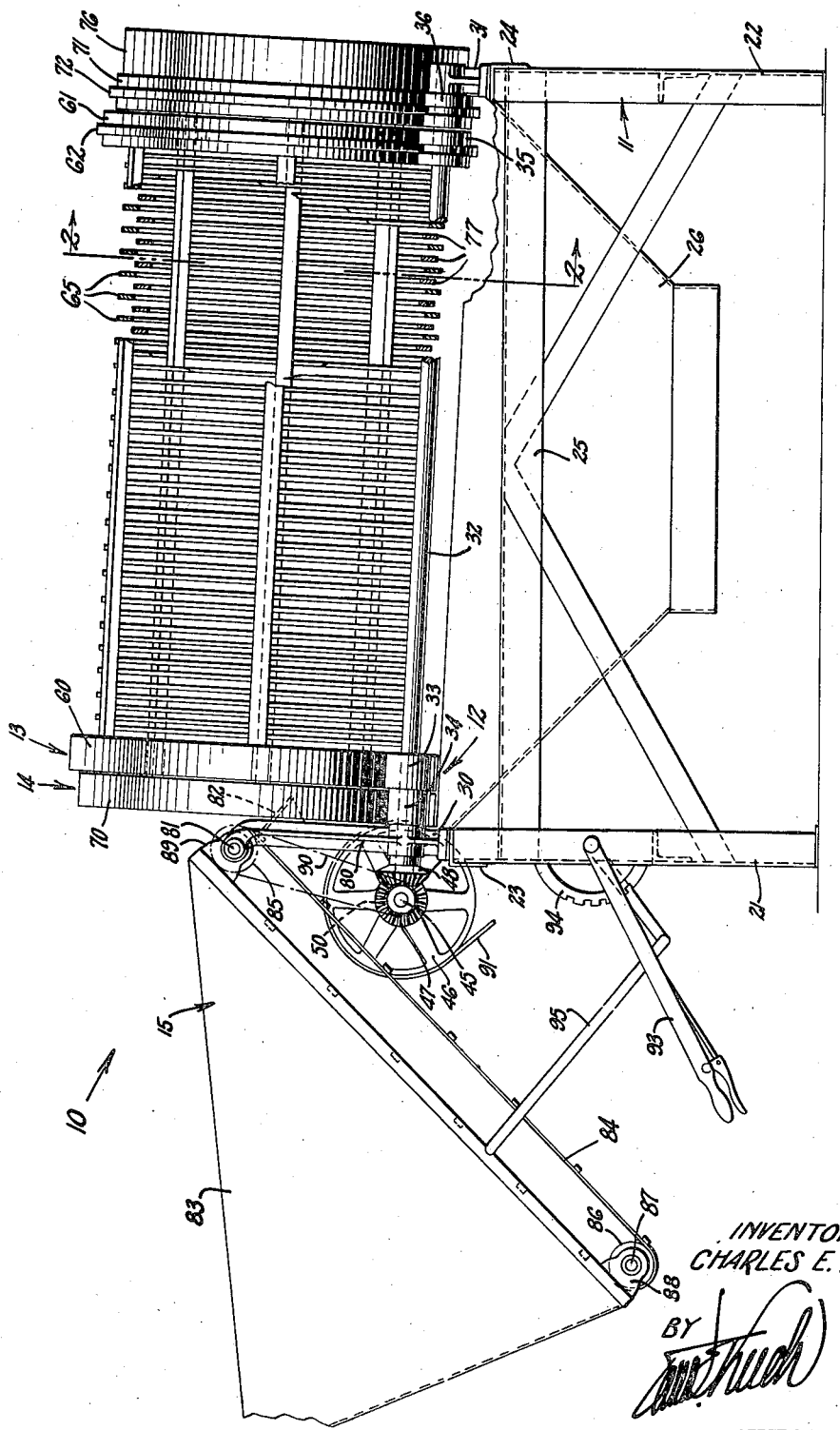
Fig. 1 is a side elevational view of a preferred embodiment of the invention partially cut away to show the internal construction thereof.

Referring specifically to the drawings a grader 10 is shown therein which includes a base frame 11, a drive mechanism 12, outer and inner rotary drums 13 and 14 and a feed mechanism 15.

The frame 11 includes legs 21 and 22 united transversely by cross angle beams 23 and 24 and united longitudinally by angle members 25. Mounted on the frame 11 is a bean hopper 26.

The mechanism 12 includes bearings 30 and 31 mounted respectively on the beams 23 and 24. Journaled in these bearings are shafts 32. Fixed on the shafts 32 just inside the bearings 30 are smooth faced rollers 33 and 34. Also fixed on these shafts just inside the bearings 31 are rollers 35 and 36 which have annular grooves 37 and 38 formed in their respective faces. The mechanism 12 also includes the drive shaft 45 having a drive pulley 46 and beveled gears 47 which mesh with beveled gears 48 provided on adjacent ends of the shafts 32 so that rotation of the shaft 45 turns the shafts 42 in the same direction at the same speed. One end of the shaft 45 is provided with a small sprocket 50 the purpose of which will be made clear hereinafter.

The outer drum 13 of the grader 10 includes a pair of heavy rings 60 and 61 the first of which rests upon the rollers 33, and the second of which rests on the rollers 35, a flange 62 provided on the ring 61 extending into the annular channels 37 of the rollers 35. The rings 60 and 61 are connected and maintained in spaced concentric relation by longitudinal bars 63 constituting a ring uniting means from the outer drum 13. The uniting of the bars 63 with the rings 60 and 61 is effected by cap screws 64. Disposed within the area inside the bars 63 is a series of uniform spaced flat rings 65, each of these rings having lugs 66 formed thereon to extend outwardly therefrom, each of these lugs being fixed in a suitable kerf provided in one of the bars 63.

The inner drum 14 includes a smooth faced ring 70 which rests upon the smooth faced rollers 34 and a ring 71 which rests upon the rollers 36 and has a flange 72 which extends into the annular grooves 38 in these rollers. The rings 70 and 71 are connected and maintained in spaced concentric relation by longitudinal bars 73 constituting a ring uniting means for the inner drum 14, these bars being connected to these ring cap screws 74, the connection being effected at the inner ends of arms 75 extending inwardly from the rings 70 and 71.

The ring 71 has a sheet metal cuff 76 which forms a discharge mouth for the grader 10.

Disposed outside of the bars 73 so as to encircle these is a series of uniform flat rings 77, each of these rings having lugs 78 formed thereon to extend inwardly therefrom, each of these lugs being fixed in a suitable kerf provided in one of the bars 73. The rings 76 and 77 are so located on the bar 73 as to be interspersed in between and an equal distance longitudinally from the rings 65 of the outer drum 13.

The rollers 34 and 36 which support the inner drum 14 are of less diameter than the rollers 33 and 35 which support the outer drum 13.

Likewise the rings 70 and 71 of the inner drum 14 are of slightly less diameter than the rings 60 and 61 of the outer drum 13. This difference in diameters causes the axis A of the outer drum 13 to be a slight distance above the axis A' of the inner drum 14.

The feed mechanism 15 includes arms 80 which are fixed on the bar 23 and extends upwardly therefrom to provide suitable bearings for a shaft 81 and to support a drop board 82 which extends into the upper or receiving end of the machine. Mounted on suitable bearings on the shaft 81 is a hopper 83 the bottom of which is formed by a draper belt 84 passing around a drum 85 mounted on the shaft 81 and an idle drum 86, the trunnions 87 of which are journaled in bearings 88. The draper belt 84 is driven by the shaft 81 being rotated by a sprocket 89 fixed thereon and which is connected to the sprocket 50 by a chain 90.

Mounted on one of the legs 21 is a lever 93 the angle of which may be fixed by a detent device 94 and which is connected by linkage 95 to the hopper 83 so as to regulate the angle of the hopper to facilitate the proper feeding of beans disposed in the hopper 83 to the grader 10.

*Operation*

The grader 10 is driven from a prime mover (not shown) through a belt 91 trained about the pulley 46. Rotation of the shaft 45 drives the draper 84 and rotates the shafts 32 thereby rotating the drums 13 and 14. The diameter ratios between rollers 34, 33, 35 and 36 and the respective rings 60—61 and 70—71 which rests on these rollers, causes rotation of these rollers to rotate the drums 13 and 14 independently of each other and with a certain amount of continuous creeping of one drum relative to the other in the same direction.

As mentioned the axis A' of the drum 14 is located slightly below that of the axis A of the drum 13 and rotation of the drums, when the grader is operating, is about their respective axes.

It is desired to point out the striking simplicity of the grader 10 as contrasted with rotary graders of the prior art. Each of the two drums 13 and 14 is an integral unit and the entire sizing mechanism of the grader consists merely of these two units. It is furthermore to be noted that neither of these units is driven from the other so there is no friction, such as would wear out and interfere with the accuracy of the grader. It is also to be noted that owing to the mounting of the rings 65 on the lugs 66 and rings 77 on lugs 78, an ample space is provided between the bars 63 and 73 that when these bars approach close to each other in their lowered positions, they are still an ample distance apart to prevent any pinching of beans between the mounting bars 73 and the rings 65. Stated otherwise the outer ring uniting means or longitudinal bars 63 are spaced radially outwardly from the outer edges of the inner rings 77, and the inner ring uniting means or longitudinal bars 73 are spaced radially inwardly from the inner edges of the outer rings 65 at the points of closest approach, a distance exceeding the width of the sizing openings or spaces between the inner and outer drum rings 77 and 65, as best viewed in Figs. 2 and 3 of the drawings.

The sizing function of the grader 10 is accomplished by the spaces or sizing openings between adjacent rings 65 and 77. The beans which are small enough to pass through one of these spaces drop into the hopper 26 and onto a belt traveling therebeneath on which they are carried away. The beans which are too thick to drop down through one of these spaces are eventually delivered from the grader through the mouth-forming cuff 76.

It is necessary of course that the sizing spaces be kept clear of beans that might jam therein. This is accomplished by the difference in diameter of the rings 65 and 77 and their rotation on different axes. This causes the respective sections of the rings 77 in between the adjacent bar 73 to shift downwardly away from corresponding sections of the ring 65 as these sections of rings 77 travel upwardly above the axis A. Beans wedged into the sizing spaces are thus released and drop onto the mass of beans disposed inside the grader.

What I claim is:

1. In a string bean grader the combination of: an outer set of spaced rings; means disposed outwardly from said rings and uniting said rings to form an outer drum; an inner set of spaced rings lying in planes interspersed alternately between the aforesaid rings of said outer drum; means disposed inwardly from said inner rings and uniting said inner rings to form an inner drum separate from said outer drum, said inner drum being of smaller diameter than the outer drum and having its axis disposed below the axis of the outer drum, sizing openings being formed by spaces between overlapping portions of the interspersed rings of said two drums, said sizing openings being circumferentially continuous throughout said overlapping portions, the first of said ring uniting means being spaced outwardly from the outer edges of said inner rings and the second of said ring uniting means being spaced inwardly from the inner edges of said outer rings at the points of closest approach, a distance exceeding the width of said sizing openings; and means for rotating said drums.

2. In a string bean grader the combination of: an outer set of spaced rings; means disposed outwardly from said rings and uniting said rings to form an outer drum; an inner set of spaced rings lying in planes interspersed alternately between the aforesaid rings of said outer drum; means disposed inwardly from said inner rings and uniting said inner rings to form an inner drum separate from said outer drum, said inner drum being of smaller diameter than the outer drum and having its axis disposed below the axis of the outer drum, sizing openings being formed by spaces between overlapping portions of the interspersed rings of said two drums, said sizing openings being circumferentially continuous throughout said overlapping portions, the first of said ring uniting means being spaced outwardly from the outer edges of said inner rings and the second of said ring uniting means being spaced inwardly from the inner edges of said outer rings at the points of closest approach, a distance exceeding the width of said sizing openings; means for rotating said drums independently of one another at different peripheral speeds so that said inner uniting means progresses relative to said outer uniting means during the operation of said grader.

3. In a string bean grader the combination of: an outer set of spaced rings; means disposed outwardly from said rings and uniting said rings to form an outer drum; an inner set of spaced rings lying in planes interspersed alternately between the aforesaid rings of said outer drum; means disposed inwardly from said inner rings and uniting said inner rings to form an inner drum separate and spaced from said outer drum, said inner drum being of smaller diameter than the outer drum and having its axis disposed below the axis of the outer drum, sizing openings being formed by spaces between overlapping portions of the interspersed rings of said two drums, the rings and uniting means of one drum being formed and disposed to be spaced from the rings and uniting means of the other drum at all points a distance at least equal to the width of said sizing openings; means for rotating said drums independently of one another at different peripheral speeds; and means for maintaining said drums in a fixed axial relation to preserve a substantially uniform width in said sizing openings.

4. In a string bean grader the combination of: an outer set of spaced rings; means disposed outwardly from said rings and uniting said rings to form an outer drum; an inner set of spaced rings lying in planes interspersed alternately between the aforesaid rings of said outer drum; means disposed inwardly from said inner rings and uniting said inner rings to form an inner drum separate and spaced from said outer drum, said inner drum being of smaller diameter than the outer drum and having its axis disposed below the axis of the outer drum, sizing openings being formed by spaces between overlapping portions of the interspersed rings of said two drums, said inner uniting means including a series of longitudinal bars disposed inwardly a substantial distance from the inner edges of the outer set of rings and lugs connecting said bars with said inner set of rings, said lugs lying in the planes of said inner set of rings so as not to substantially obstruct the movement of beans into said sizing openings, said sizing openings thus being open to the reception of beans and continuous circumferentially past the connections of said inner set of rings with said inner uniting means, and means for rotating said drums independently of one another at different rotational speeds in the same direction to obtain continuous relative circumferential creepage of said drums.

5. In a string bean grader the combination of: an outer set of spaced rings; means disposed outwardly from said rings and uniting said rings to form an outer drum; an inner set of spaced rings lying in planes interspersed alternately between the aforesaid rings of said outer drum; means disposed inwardly from said inner rings and uniting said inner rings to form an inner drum separate from said outer drum, said inner drum being of smaller diameter than the outer drum and having its axis disposed below the axis of the outer drum, sizing openings being formed by spaces between overlapping portions of the interspersed rings of said two drums, said sizing openings being circumferentially continuous throughout said overlapping portions; and means for rotating said drums independently of one another at different rotational speeds in the same direction to obtain continuous relative circumferential creepage of said drums.

CHARLES E. KERR.

REFERENCES CITED

The following references are of record in the file of this patent:

UNITED STATES PATENTS

| Number | Name | Date |
| --- | --- | --- |
| 2,241,977 | Buck | May 13, 1941 |
| 1,689,254 | Ryder | Oct. 30, 1928 |
| 1,972,385 | Hutton | Sept. 4, 1934 |
| 1,414,156 | Ross | Apr. 25, 1922 |
| 1,420,685 | Burch | June 27, 1922 |
| 2,335,891 | Urschell | Dec. 7, 1943 |
| 951,082 | Kidder | Mar. 1, 1910 |
| 2,207,131 | Pellam | July 9, 1940 |
| 457,656 | Metherell | Aug. 11, 1891 |